United States Patent [19]

Taccani

[11] 4,129,639
[45] Dec. 12, 1978

[54] METHOD AND APPARATUS FOR MANUFACTURING OPEN END SLIDING CLASP FASTENERS

[75] Inventor: Riccardo Taccani, Milan, Italy

[73] Assignee: Interbrev S. A., Luxembourg, Luxembourg

[21] Appl. No.: 735,104

[22] Filed: Oct. 22, 1976

[30] Foreign Application Priority Data

Oct. 23, 1975 [CH] Switzerland ............... 13718/75

[51] Int. Cl.² .................. B29D 3/00; B29D 5/00
[52] U.S. Cl. ...................... 264/157; 264/252; 264/257; 264/328
[58] Field of Search .......... 264/138, 157, 160, 161, 264/163, 259, 261, 328, 252; 425/814, DIG. 34, 123, 324, 444, 545

[56] References Cited

U.S. PATENT DOCUMENTS

| | | | |
|---|---|---|---|
| 2,045,471 | 6/1936 | Kasen | 264/163 |
| 2,262,881 | 11/1941 | Boenecke | 425/814 |
| 2,497,951 | 2/1950 | Low | 425/814 |
| 2,807,970 | 10/1957 | Dorman | 425/814 |
| 3,112,523 | 12/1963 | Goulet et al. | 425/324 |
| 3,982,870 | 9/1976 | Boden et al. | 425/444 |

Primary Examiner—Willard E. Hoag
Attorney, Agent, or Firm—Miller & Prestia

[57] ABSTRACT

In a method of making separable sliding clasp fasteners, the interlocking elements of a thermoplastic material which are on the edge of a band of the fastener are placed in a mold such that thermoplastic material is injected into the mold and formed over a segment of the interlocking elements and allowed to solidify. By cutting the solidified material in the mold, the male parts of a separating device of the fastener are formed. A device for carrying out this process includes a mold comprising an upper half and a lower half. The lower half of the mold has on each side of its central axis, a longitudinal cavity and a band reinforcement track, adjacent to the cavity, and means for injecting molten thermoplastic material into the mold. Each of the cavities has a stationary part and a moveable part, with two lines of contact between the stationary and the movable parts, the purpose of which is to shape the two opposite lateral sides of the two male parts to be manufactured.

1 Claim, 6 Drawing Figures

METHOD AND APPARATUS FOR MANUFACTURING OPEN END SLIDING CLASP FASTENERS

The present invention relates to a process for manufacturing a separable sliding clasp fastener having two halves, each half consisting of a band having, on its inside edge, a row of interlocking elements of thermoplastic material; an top stop on each half; a separating device consisting of one female part and two male parts, one on each fastener half and adjacent to the row of interlocking elements; and a sliding clasp which, when moved in either direction, causes engagement or disengagement of the two rows of interlocking elements. More particularly, the process of the present invention relates to the forming of the male parts of a separable slide fastener.

Complete separation of the two halves of such a sliding clasp fastener is made possible by the separating device, one male part of which is detachable from the female part, that is, it can be inserted into the female part to engage or couple the two fastener halves and be removed from that female part to completely separate the two halves; hence the designation "separable fastener."

The male parts of a separating device must be relatively rigid and connected to the interlocking elements so as to provide continuity with them in order for the sliding clasp of the fastener to slide without catching.

In known separable sliding clasp fasteners the male separating device members are composed of small metal or plastic bars attached — that is, fastened by an suitable process — to the edges of the bands in place of a certain number of previously removed fastening elements. It is evident that the need to remove a certain number of these elements, in order to attach a predetermined male part, presents technical as well as economic drawbacks.

First of all, such a process does not lend itself to continuous fabrication, that is, manufacturing a series of male parts on each of the two halves of a continuous fastener prior to cutting that fastener to the desired length. Furthermore, an acceptable connection between a male part and the interlocking elements preceding it is possible only at the expense of a long and delicate adjustment. This greatly reduces production speed and therefore increases cost.

The object of this invention is to provide a process which is free from the difficulties indicated above.

To this end, the process according to the present invention is characterized by the fact that, in manufacturing the male parts, a length of each of the two disengaged halves of a continuous fastener is inserted into a mold in such a manner that the band will be placed above a band reinforcement track and the row of engaging elements will be housed in a cavity larger than the row itself where the band side wall and the two walls crosswise to the band are shaped like the male part to be manufactured. Molten thermoplastic material is injected into the mold and allowed to harden. The solidified material is then cut between the two cavities to form the opposite lateral sides of the two male parts.

The male parts are therefore manufactured in place, simultaneously, on each of the two halves of a continuous fastener, without requiring removal of engaging elements from the band section intended to receive a male part. The small bar forming a male part, which encloses the interlocking elements on its position, and the element preceding it are all in one, eliminating the connection problem.

Following simultaneous molding of the two male parts, the two disengaged halves of the continuous fastener can be advanced to bring into the mold the next two sections to receive another pair of male parts. Thus, male parts can be manufactured continuously on the two halves of a continuous fastener as it comes from a tooth-molding or weaving or sewing machine, that is, before the continuous fastener has been cut into fasteners of the desired length. The process can therefore be practiced continuously.

The process according to this invention has the further advantage of enabling the production of male parts in the material and color of the interlocking elements. Another advantage of the process is that the bands are reinforced in the area of the male parts while they are being manufactured.

This invention also relates to a device for carrying the process into effect. The device includes a mold comprising an upper half-mold and a lower half-mold. The lower half-mold has, on each side of its central axis, a longitudinal cavity and a band reinforcement track, adjacent to the cavity, and means for injecting molten thermoplastic material into the mold. This device is characterized by the lower half-mold and the upper half-mold each having one stationary part and one movable central portion perpendicular to the stationary part. The movable part of the upper half-mold is subjected to a spring force action tending to keep it in a position whereby its lower surface is on a level with that of the stationary part. The movable part of the lower half-mold is integral with a grooved piston, slidable in a sealed chamber constituting the stationary part of this half-mold and connected to a source of fluid under pressure. Each of the cavities provided with a stationary part and a movable part. The two lines of contact of the stationary part and this movable part. The walls of cavities one at the bottom of each cavity, are each shaped like one of the two opposite lateral sides of the two male parts to be manufactured.

The attached drawings represent schematically, and by way of example, one form of apparatus according to this invention, a segment of an open continuous sliding clasp fastener, before and after the production of the male parts, and a section of a closed slide fastener provided with separation means.

Figure 2:
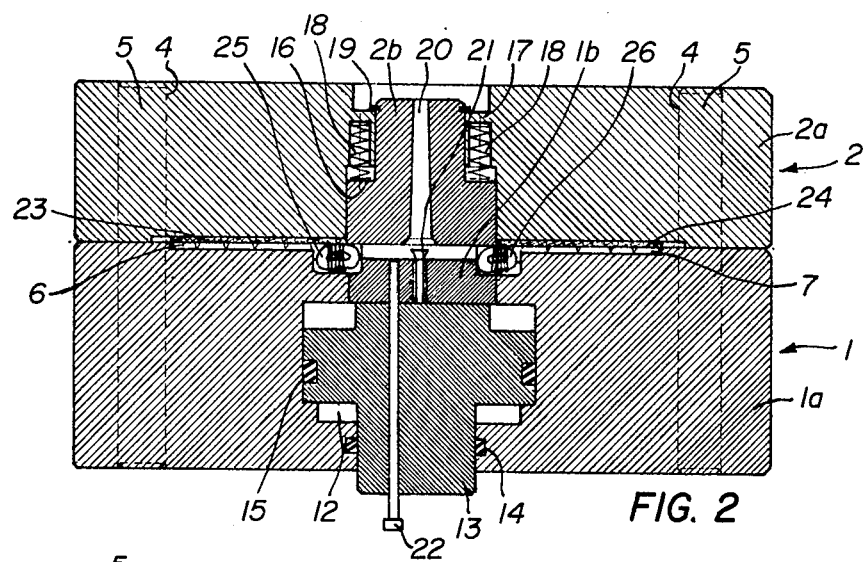
FIG. 2 is a vertical section of the device of the present invention.
Figure 4:
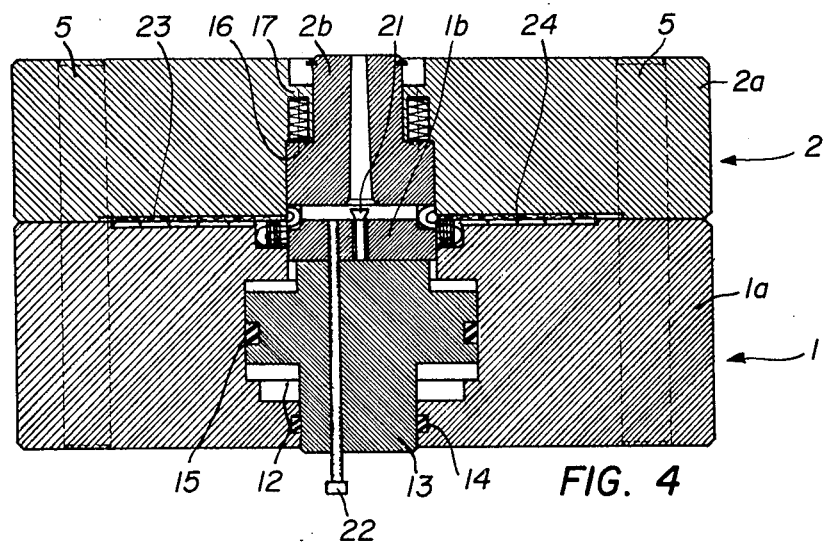
FIG. 4 is a vertical section of the device showing another position of its components.

The device represented in FIGS. 2 and 4 includes a mold consisting of a lower half-mold 1 and an upper half-mold 2, each having a stationary part 1a and 2a and a movable center part 1b and 2b perpendicular to the stationary parts. Centering of the half-molds 1 and 2 is achieved through centering holes 3 and 4, in the stationary parts 1a and 2a, and by the pins 5.

Figure 3:
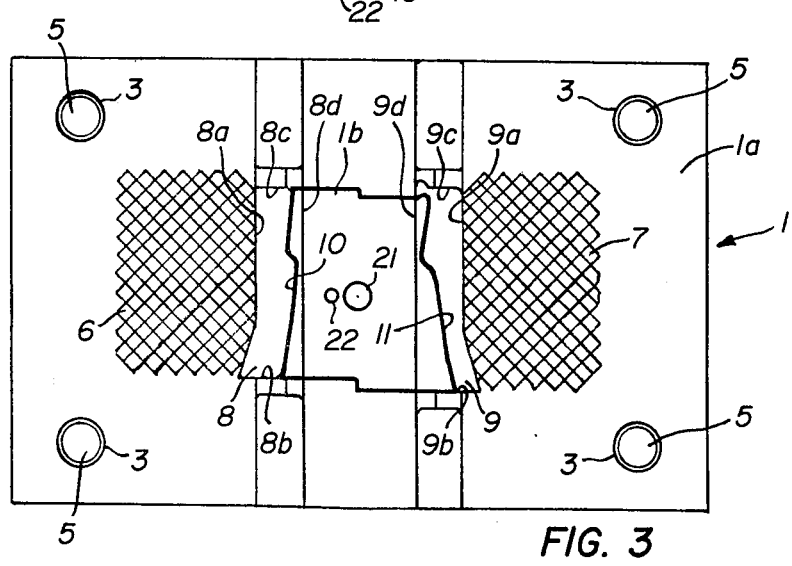
FIG. 3 is a view of the plan of the lower half of the device.

The stationary part 1a of lower half-mold 1 contains two tracks 6 and 7 (FIG. 3) each representing a reinforcement band, and each being arrranged symmetrically on the right and left halves of the mold. The lower half-mold 1 contains, among other things, two longitudinal cavities 8 and 9, arranged symmetrically between tracks 6 and 7; the cavity 8 being contiguous to track 6 and cavity 9 being contiguous to track 7. Each cavity 8 and 9 extends width-wise on stationary part 1a and movable center part 1b of half-mold 1. The walls 8a and 9a of cavities 8 and 9, which are contiguous to tracks 6 and 7 (and also to the transverse walls 8b, 8c and 9b and 9c), represent the form of one of the male parts to be manufactured. The walls 8d and 9d of cavities 8 and 9 opposite to tracks 6 and 7 are shallower than walls 8a and 9a, and are contiguous to this track. The two lines of contact 10 and 11, between stationary part 1a and movable center part 1b of lower half-mold 1, in which 10 is at the bottom of cavity 8, and 11 is at the bottom of cavity 9, each represent the form of one of the lateral opposite sides of the male part to be manufactured.

Positioned in chamber 12, located in stationary part 1a under movable center part 1b, is a grooved piston 13 having sealed segments 14 and 15. Chamber 12 is connected, by a means not shown, to a source of fluid under pressure, also not shown.

Between a shoulder 16 of movable center part 2b and a shoulder 17 of stationary part 2a of the upper half-mold 2, are support springs 18 which stretch to maintain the movable center part 2b in its position as shown in FIG. 2 (that is to say its lowered position) determined by the position of interdependent ring 19 against shoulder 17, with its lower face at the level of the lower surface of stationary part 2a. Movable center part 2b is crossed by a passageway 20 which is intended to receive an injection of molten thermoplastic material and to convey it to the interior of the mold. Movable center part 1b contains an extractor 21, which juts out of its upper surface. An expeller 22 is slidably mounted across stationary part 1a and movable center part 1b of lower half-mold 1.

Figure 1:
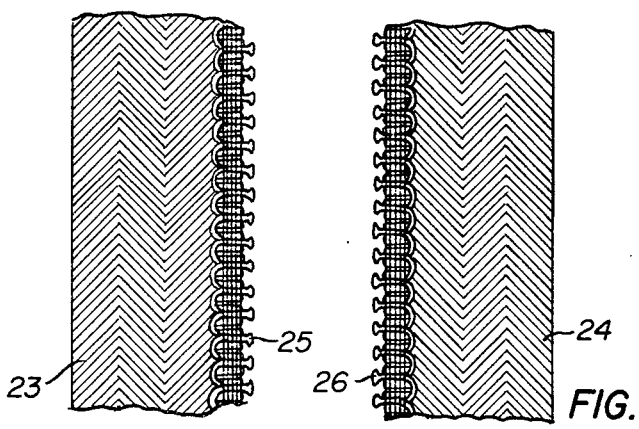
FIG. 1 shows a segment of an opened sliding clasp fastener before production of the male parts.

The process is carried out, by the apparatus just described, in the following way:

The mold shown in FIG. 2 is opened by removing the upper half-mold 2, and the two coupling halves of the sliding clasp fastener are placed on the lower half-mold 1, as shown in example in FIG. 1. Each coupling half comprises a band 23, 24, carrying at its interior edge a spiral formed of flattened helices 25 and 26 in such a manner that a segment of band 23 is positioned above track 6 and a segment of band 24 is above track 7. The helices on the edge of the first section should be deposited in cavity 8 and those of the second section in cavity 9. Next, the mold is closed by moving the upper half-mold 2 down onto the lower half-mold 1. FIG. 2 shows in section, the mold together with the two halves of the slide fastener which it encloses.

Molten thermoplastic material is injected into the closed mold through passage 20 and penetrated into tracks 6 and 7, into cavities 8 and 9 and into the space between movable center parts 1b and 2b. The injected material is allowed to solidify. After this, a fluid under pressure is introduced into chamber 12 in a manner to displace the piston 13 in the direction of upper half-mold 2. Consequently, movable parts 1b and 2b are re-united by the solidified material between them, counter to the action of springs 18, up to the point where the shoulder 16 of part 2b is positioned against shoulder 17 of stationary parts 2a. In the course of its displacement movable center part 1b slices off (at the edges) all the molten material between the two heavy lines 10 and 11 (FIG. 3), and consequently slices off part of each of the two rows of helices united in the injected material and solidified therein. FIG. 4 shows, in section, the positions of the separate components of the device at the end of this step.

The operator then relieves the fluid pressure, which consequently returns movable center parts 1b and 2b under the action of springs 18 to their positions as represented in FIG. 2. Then, upon lifting the upper half-mold 2 to open the mold, the sliced portion included between movable center parts 1b and 2b will remain attached to movable center part 1b and by virtue of the extractor 21 will subsequently be separated by use of the expeller 22.

Figure 5:
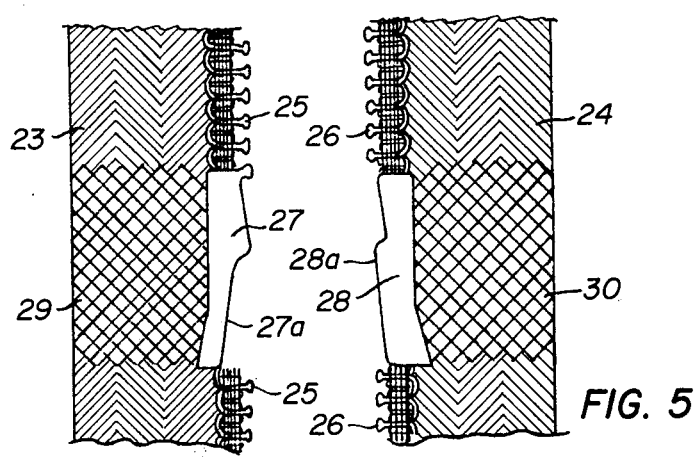
FIG. 5 shows a segment of the opened slide fastener furnished with a pair of male parts.

After opening the mold, the two halves of the slide fastener are raised. Each half is provided with a male part 27 and 28 (FIG. 5) and a corresponding reinforcement band 29 and 30 that is formed by the thermoplastic material which penetrated there. As shown, the forms of the sides 27a and 28a laterally opposite male parts 27 and 28, produced by slicing, correspond to those of the lines of contact of the stationary part 1a and movable center part 1b of lower half-mold 1, which are found in the bottoms of cavities 8 and 9.

Figure 6:
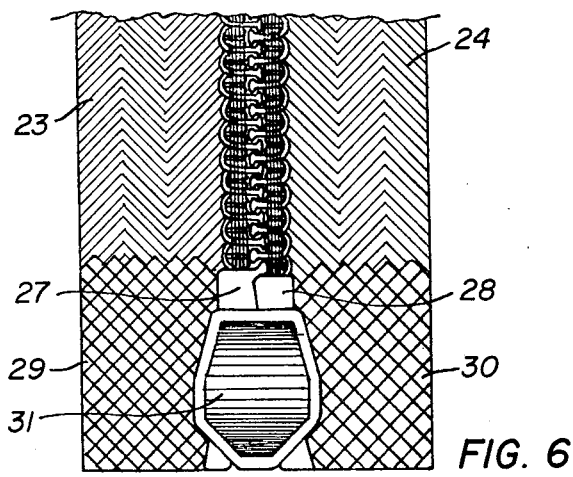
FIG. 6 shows a slide fastener provided with separators shown in the closed position.

FIG. 6 represents the lower extremity of a slide fastener provided with a separating means in which the male parts 27 and 28 are obtained according to the present invention. The female part 31 is obtained and fixed to each of the male members, and at the same time in a known manner.

The male part 27 is then detachable and can be pulled from female part 31, to permit the complete separation of the two halves of the sliding clasp fastener. Also, the slide, not shown, will have caused them to uncouple by butting against female part 31.

I claim:
1. In a process for making a separable sliding clasp fastener comprising two halves, each having a band, said band having on its inside edge, a row of interlocking elements of thermoplastic materials, a top stop on each half; a separating device having one female part and two male parts, one on each fastener half and adjacent to the row of interlocking elements and a sliding clasp which, when moved in either direction causes coupling or uncoupling of the two rows of interlocking elements, which comprises the steps of inserting a segment of each of the two disengaged halves of a continuous fastener, said halves having a row of interlocking elements thereon, into a mold having a band reinforcement track and a cavity adjacent thereto in such a manner that the band will be placed above the band reinforcement track and the row of interlocking elements will be housed in the cavity, the cavity being larger than the row itself, said cavity having a band side wall and two walls crosswise to the band being shaped like the male part to be manufactured, injecting molten thermoplastic material into the mold for the purpose of forming a reinforcement band and the male parts of said fastener, allowing the thermoplastic material to harden forming a reinforcement band, and then cutting the solidified material to further form the opposite lateral sides of the two male parts.

* * * * *